H. G. CORBIN.
POTATO SEPARATOR.
APPLICATION FILED AUG. 26, 1915.

1,182,144.

Patented May 9, 1916.
2 SHEETS—SHEET 2.

Witnesses

Inventor
H. G. Corbin.
By
Attorneys.

UNITED STATES PATENT OFFICE.

HENRY G. CORBIN, OF ROUNDUP, MONTANA.

POTATO-SEPARATOR.

1,182,144.

Specification of Letters Patent.

Patented May 9, 1916.

Application filed August 26, 1915. Serial No. 47,476.

*To all whom it may concern:*

Be it known that I, HENRY G. CORBIN, a citizen of the United States, residing at Roundup, in the county of Musselshell, State of Montana, have invented certain new and useful Improvements in Potato-Separators; and I do hereby declare the following to be a full, clear, and exact description of the invention, such as will enable others skilled in the art to which it appertains to make and use the same.

This invention relates to a potato picker.

An object of the invention resides in the provision of a device for separating potatoes from stones, dirt and any other foreign matter as they are gathered from the field.

A further object of the invention resides in so constructing the device that the potatoes will not be bruised or otherwise injured.

A further object of the invention resides in the provision of a device which may be incorporated in a potato digger so as to free the potatoes from the rocks and dirt as they are dug from the ground or which may be mounted on an independent carriage so that potatoes which have been previously dug from the ground may be gathered.

With these and other objects in view such as will appear as my description progresses, my invention comprises the combination and arrangement of parts as set forth in and falling within the scope of the appended claims.

Figure 1:
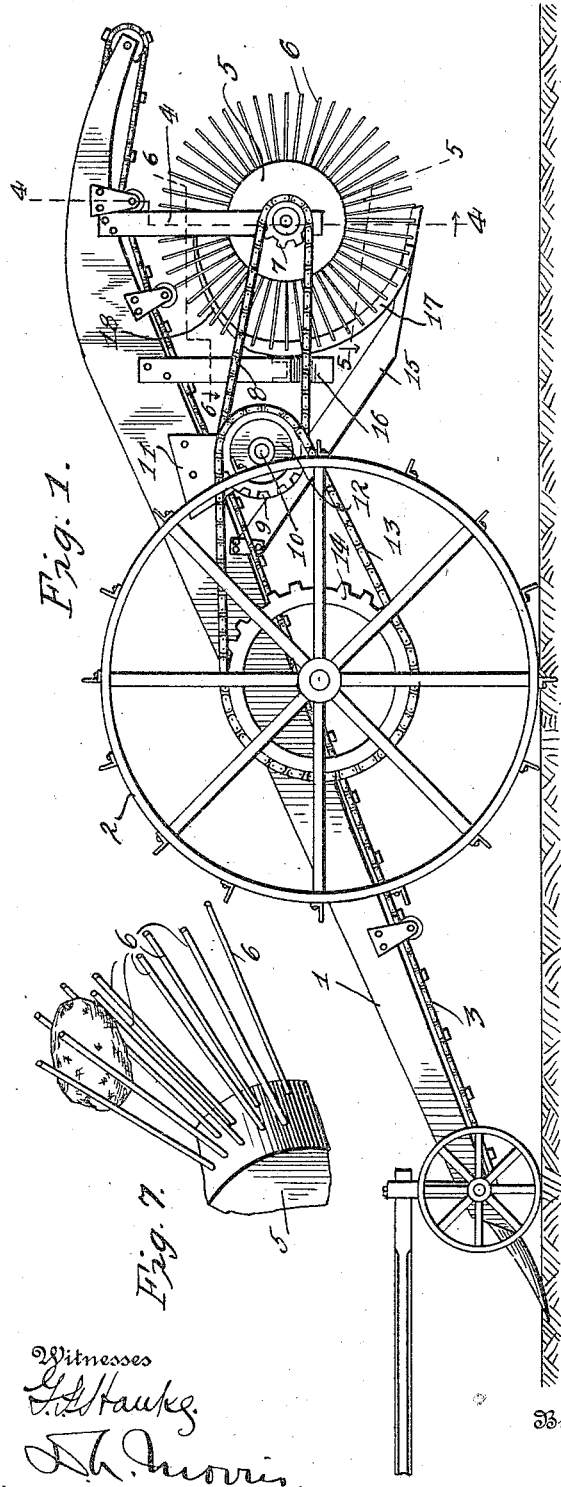
Figure 2:
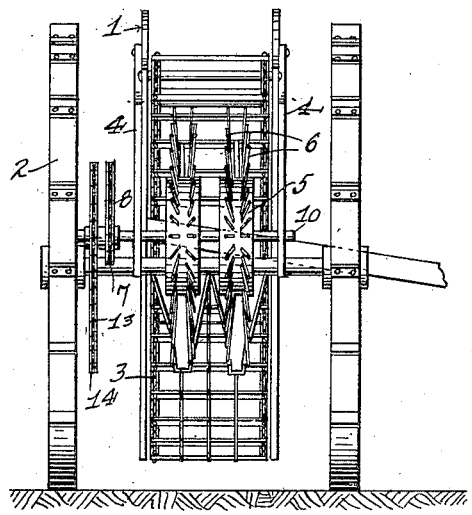
Figure 4:
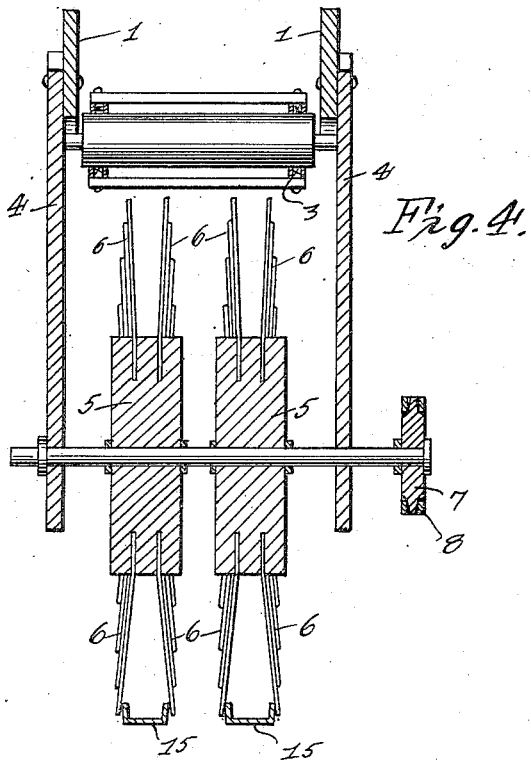
Figure 5:
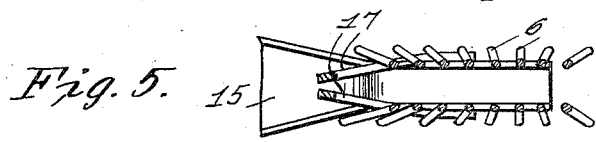
Figure 6:
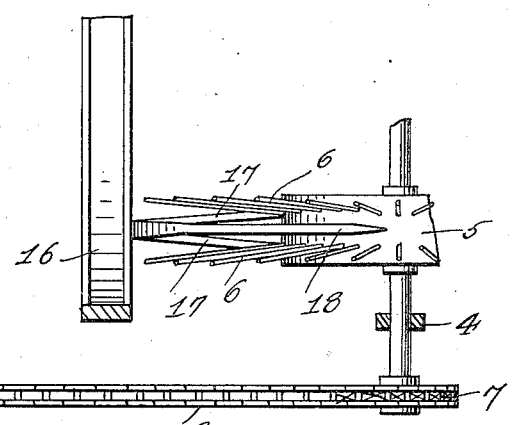

In the drawing: Figure 1 is a side elevation of my device showing the same mounted on one type of digger; Fig. 2 is a rear elevation thereof; Fig. 3 is a plan view; Fig. 4 is a section on line 4—4 of Fig. 1; Fig. 5 is a section on line 5—5 of Fig. 1; Fig. 6 is a section on line 6—6 of Fig. 1; and Fig. 7 is a fragmental detail showing the manner in which the potatoes are held in the picking fingers.

Referring to the drawing wherein like parts are indicated by like characters throughout the several views: In the drawing, I have illustrated a potato digger which includes a main frame 1 supported by wheels 2 and having a conveyer 3 operable thereon.

Mounted in suitable brackets 4 on the frame 1 is a hub 5 which is located beneath the rear end of the frame 1. Extending radially from the hub 5 is a plurality of resilient fingers 6 which are arranged in pairs, the members of the pairs being on the opposite sides of the hub. The members of these pairs of fingers converge inwardly as will be clearly seen in Fig. 4 of the drawing. In order that this hub and fingers may be rotated, I have secured a sprocket 7 to the hub over which a chain 8 extends which chain passes over a sprocket 9 which is secured to a shaft 10 mounted in suitable bearings 11 upon the frame 1. A second sprocket 12 is secured to this shaft and a chain 13 passes around this sprocket and around a sprocket 14 upon one of the wheels 2. The hub 5 and the fingers 6 constitute the picker and they will hereafter be referred to, collectively, as the picker and individually as members of the picker.

In order that the material, including potatoes, stones and other material, may be fed to the picker, I have provided a chute 15 which receives the material from the conveyer and extends beneath the picker so that the fingers of the picker are slightly above the upper surface of the chute. Extending from a point adjacent the periphery of the picker is a chute 16 which is located above the chute 15 and is provided with a conveyer belt so that potatoes may be raised therein and dropped into a suitable receptacle such as a wagon or the like.

In order that the members of the pairs of fingers 6 may be spread apart to allow the potatoes which have been previously picked to drop into the chute 16 and so that they will be in position to receive the potatoes from the chute 15, I have provided a wedge shaped spreader which is arranged vertically within the picker between the fingers thereof. This spreader includes a pair of downwardly diverging bars 17 which are of arcuate formation and intersect at their upper ends. These bars then project inwardly into the picker in angular relation to the remaining portions of the bars as clearly shown in Fig. 1 of the drawing at 18. The spreader terminates at its lower end at a point slightly forwardly of the end of the chute 15.

In using the device the potatoes, dirt, stones and other material are fed downwardly through the chute 15, the dirt passing to the ground from the end of the chute. The fingers 6 at the lower end of the spreader are spread apart and the stones and potatoes pass between the fingers. As each pair of fingers passes beyond the end of the spreader they snap together because of their resiliency and catch the potato or stone. As the picker revolves the stones and potatoes which are gripped by the fingers will be moved from the end of the chute 15 and the potatoes will be lifted. The stones will, however, be dropped from the fingers inasmuch as their resiliency is not sufficiently great to maintain the stones between them, the weight of a stone being greater than the weight of an equal sized potato. Thus the potatoes will be separated from the dirt and stones. The potatoes will be carried around by the pickers and over the extension 18 of the bars 17. During the further revolution of the picker, the potatoes will be forced outwardly from between the fingers by the said extension 18. When the extension has finally pushed the potatoes entirely from between the fingers they will drop into the chute 16 and be carried to the receptacle above referred to.

From the foregoing description it will be seen that I have provided a device for picking potatoes from the stones and dirt which are usually dug from the ground with them or which are intermingled with them when the potatoes are picked from the ground after having been turned up to dry.

While I have illustrated and described a particular embodiment of my invention, it has merely been for the sake of convenience and I do not wish to be limited to that particular embodiment as it is obvious that numerous changes may be made within the scope of the appended claims.

What I claim is:—

1. In a potato picker, the combination with a revolubly mounted hub, of a plurality of radially extending resilient fingers arranged in pairs, the members of each pair converging outwardly from the hub, a spreader mounted between the fingers and adapted to force the members of each pair apart and a chute extending slightly beyond the lower end of the spreader.

2. In a device of the class described, the combination with a picker including a plurality of pairs of converging resilient fingers, and means for spreading the said fingers apart and maintaining them in such position during a predetermined portion of their movement.

3. In a device of the class described, the combination with a hub, of a plurality of outwardly extending converging resilient fingers, and a spreader arranged between said fingers concentrically with the hub and having an extension at its upper end for receiving the potatoes in their movement.

4. In a potato picker, the combination with a plurality of radially extending resilient converging fingers arranged in pairs, of a spreader mounted between the fingers and adapted to spread the members of the pairs apart, the said spreader including diverging bars of arcuate formation and an angularly projecting extension.

5. In a device of the class described, the combination with a revolubly mounted hub, of a plurality of radially extending resilient fingers arranged thereon in pairs, a spreader mounted between the pairs of said fingers, the said spreader being constructed and arranged to guide the potatoes between the fingers at the lower end of the device and to force them from between the fingers at the upper end thereof, a chute for conveying the potatoes to the lower end of the spreader and a conveyer for receiving them from the upper end thereof.

6. In a device of the class described, the combination with a revolubly mounted hub, of a plurality of pairs of fingers mounted thereon and extending radially therefrom, means for forcing the members of the pairs apart at the lower end of the device for the reception of potatoes and means for disengaging the potatoes from the fingers at the upper end of the device.

In testimony whereof, I affix my signature, in the presence of two witnesses.

HENRY G. CORBIN.

Witnesses:
 M. R. FOSTER,
 J. W. FOSTER.

Copies of this patent may be obtained for five cents each, by addressing the "Commissioner of Patents, Washington, D. C."